Patented Dec. 2, 1947

2,431,800

UNITED STATES PATENT OFFICE 2,431,800

PROCESS FOR EMULSIFYING POLYVINYL BUTYRAL AND A SOLVENT PLASTICIZER IN WATER

Alexander J. Geiges, East Orange, N. J., assignor to The Baker Castor Oil Company, Jersey City, N. J., a corporation of New Jersey No Drawing. Application March 16, 1944, Serial No. 526,817

12 Claims. (Cl. 260—23)

This invention relates to a process for emulsifying polyvinyl acetal resins or plastics in water. This emulsion is particularly suitable for application to surfaces of flexible material such as paper, cloth, etc. This emulsion may be incorporated into other materials. For instance, in the manufacture of paper, the plasticized resin emulsion can be added to the paper fiber slurry suspended in water as the slurry is being masticated in the beater tanks. The paper so made after being relieved of the water on standard paper making machines will contain fibers coated with plasticized acetal resin.

This process has been found to be particularly suitable for polyvinyl butyral and other polyvinyl acetal resins.

The success and rapidity of this process appears to be due to the use of certain plasticizers which have active solvent properties for these resins. These plasticizers appear to be either actively polar themselves or compatible with polar materials that also have at least partial solvent effects on the resins. The plasticizer should be relatively non-volatile at room temperature.

The method of compounding these plasticizers and resins to produce the desired emulsion in accordance with this invention may be accomplished by means of a heated dough-type mixer. The process can also be carried out in a rubber-compounding mill, Banbury type mixer, or other types of colloid mills.

Due to the fact that these resins can be softened by heat, the mill is heated by high pressure steam in its jacketed section before the resin is added and the heating is increased to about 250° F. after the resin is added. These resins possess a marked softening point at approximately 250° F. The suitable solvent plasticizer is added slowly to the resin while the resin is being milled and while the heating is continued, until the amount of plasticizer needed to produce the desired properties in the plasticized resin has been added.

Suitable plasticizers for carrying out this process have acid numbers in the neighborhood of 20 to 40. But in those instances where the acid numbers of the plasticizers are less than 20, acidic materials, such as, the fatty acids present in castor oil, soya bean oil, etc.; or fatty acids of these oils after the natural-occurring oil had been oxidized; or wood resin acids alone are dispersed by heat in sufficient fatty acids of vegetable oil to soften them; or tall oil acids, etc., are added to the hot plasticized resin while it is being milled so as to bring the acid number of the compounded resin batch within about 20 to 40.

In cases where a suitable plasticizer has already been added to the resin, or the resin is obtained in a suitably plasticized form, the desired amount of acidic material is added slowly to the compounded resin mass and is mixed therein while heating.

When the mixing in the mill is completed, as indicated by a homogenous mass of plasticizer and resin free from visible particles of undispersed particles of resin, the heat is turned off and cold water is run through the jacket of the mill to reduce the temperature of the milling plasticized resin to about 200° F. A sufficient amount of a solution of 10% aqueous caustic alkali such as soda or potash is then introduced while the milling is continued to reduce the acid number to about half of its original figure. The batch should have been cooling meanwhile until a temperature below 120° F. is reached. The acid number is then reduced to approximately zero by the addition of a 10% ammonium hydroxide solution.

The compounded resin may then be reduced with further amounts of water to a thin emulsion or distributed in this concentrated form for further dilution at the point where the application of this resin coating is to be made.

Improvements in the emulsified product were obtained by using triethanolamine, morpholine and other organic amines instead of a mixture of caustic and ammonia to accomplish emulsification. These amines produced irreversible dry films of the plasticized resin that was not spotted by drops of water drying thereon.

The addition of suitable buffers in the mill has been found to be advantageous since they enable stable emulsions to be produced from emulsions in which the pH was subject to change on ageing. Ammonium borate and ammonium phosphate, for example, are suitable for this purpose.

By making a few tests one can select those plasticizers which are most suitable for the particular resin that is to be emulsified. Suitable solvent-plasticizers in carrying out this invention include the following commercially known materials: castor oil, C. P.; ester type derivatives of vegetable oil fatty acids, such as the butyl ester of the fatty acids present in naturally-occurring castor oil; oxidized and polymerized vegetable oils, commonly known as blown vegetable oils; and the so-called chemical plasticizers, dibutyl phthalate, dioctyl-phthalate, tricresyl phosphate, triphenyl phosphate, dibutyl sebacate, etc.

The following are given as specific examples of carrying out the process:

Example I

| | Parts by weight |
|---|---|
| Use | |
| Polyvinyl butyral resin | 750 |
| Pale blown castor oil having an acid number of 20 and a viscosity of about 40 poises | 675 |
| Castor oil fatty acids having an acid number of 170 | 75 |

Mill the resin and add the pale blown castor oil and castor oil fatty acids slowly, keeping mix at temperature of 250° F. Add caustic and ammonia as described above.

Example II

| | Parts by weight |
|---|---|
| Polyvinyl butyral resin | 750 |
| Butyl ricinoleate having an acid number of 4 | 675 |
| Castor oil fatty acids having an acid number of 170 | 75 |

Mill resin and add the butyl ricinoleate and castor oil fatty acids slowly, keeping mix at temperature of 250° F. Add caustic and ammonia as described above.

Example III

| | Grams |
|---|---|
| Polyvinyl butyral resin | 750 |
| Pale blown castor oil having an acid number of 36–40, and a viscosity of about 100–150 poises | 750 |

Treat as in the preceding examples.

Example IV

| | Grams |
|---|---|
| Polyvinyl butyral | 750 |
| (1) Tricresyl phosphate | 150 |
| (2) Dibutyl phthalate | 100 |
| (3) 2-methoxyethyl acetyl ricinoleate | 100 |
| (4) Butyl ester of acetylated polyricinoleic acid | 100 |
| (5) Castor oil fatty acids having an acid number of 170 | 150 |

Mill (1), (2), (3) with resin at 250° F. until the mass is homogenous. Add (4) and (5) at 250° F. Cool to 200–120° F. and emulsify.

What is claimed is:

1. The process of preparing a coating and impregnating composition which comprises emulsifying a water insoluble polyvinyl butyral resin by mixing said resin at 250° F. with from 80% to 100%, based on said polyvinyl butyral resin, of an acidic composition having an acid number in the range from 20 to 40, said composition consisting of a solvent plasticizer comprising an ester selected from the group consisting of aliphatic esters of long-chain fatty acids and of aliphatic and of aromatic dicarboxylic acids together with a long-chain fatty acid, cooling the plasticized mass to 200° F., adding sufficient aqueous alkaline solution to reduce the acid number to one-half of its original value, and, when the mass has cooled to below 120° F., adding sufficient dilute, aqueous nitrogen-containing base selected from the group consisting of ammonium hydroxide, triethanolamine, and morpholine to complete the neutralization, agitation being used throughout the neutralizing steps.

2. The process of claim 1, in which a buffer chosen from the group consisting of ammonium salts of boric and phosphoric acids is incorporated during the process.

3. The process of claim 1, in which said solvent plasticizer is an aliphatic ester of a long-chain fatty acid.

4. The process of claim 1, in which said aqueous alkaline solution contains an alkali metal hydroxide.

5. The process of claim 1, in which said nitrogen-containing base is ammonium hydroxide.

6. The process of claim 1, in which said nitrogen-containing base is triethanolamine.

7. The process of preparing a coating and impregnating composition, which comprises emulsifying a water insoluble polyvinyl butyral resin by blending it with a mixture of an aliphatic ester of a vegetable oil fatty acid and a vegetable oil fatty acid, from 80% to 100% of said mixture being used, based on the polyvinyl butyral resin, and said mixture having an acid number of 20 to 40, at 250° F. until homogeneity is attained, cooling the plasticized mass to 200° F., adding sufficient dilute aqueous caustic alkali to reduce the acid number to one-half of its original value, and, when the mass has cooled to below 120° F., adding sufficient dilute ammonium hydroxide to complete the neutralization, agitation being used throughout the neutralizing steps.

8. The process of claim 7, in which said aliphatic ester of a vegetable oil fatty acid is castor oil.

9. The process of claim 7, in which said aliphatic ester of a vegetable oil fatty acid is a mixture of 2-methoxy ethyl acetyl ricinoleate and the butyl ester of acetylated polyricinoleic acid.

10. The process of claim 7, in which said aliphatic ester of a vegetable oil fatty acid and said vegetable oil fatty acid are replaced by a blown vegetable oil having an acid number of 20 to 40.

11. The process of claim 7, in which said vegetable oil fatty acid is ricinoleic acid.

12. The process of claim 7, in which said vegetable oil fatty acid is replaced by an oxidized vegetable oil fatty acid.

ALEXANDER J. GEIGES.

REFERENCES CITED

The following references are of record in the file of this patent:

UNITED STATES PATENTS

| Number | Name | Date |
|---|---|---|
| 2,046,378 | Haux | July 7, 1936 |
| 2,143,228 | Orthner et al. | Jan. 10, 1939 |
| 2,291,697 | Cox et al. | Aug. 4, 1942 |
| 2,258,410 | Dahle | Oct. 7, 1941 |
| 2,290,180 | Hershberger | July 21, 1942 |
| 2,356,250 | Land | Aug. 22, 1944 |
| 2,375,348 | Cohen | May 8, 1945 |